(12) United States Patent
Blohm et al.

(10) Patent No.: US 9,797,712 B2
(45) Date of Patent: Oct. 24, 2017

(54) METHOD FOR EVALUATING FRESNEL DIFFRACTION BORDER PROFILES

(71) Applicant: Sikora AG, Bremen (DE)

(72) Inventors: Werner Blohm, Misselwarden (DE); Harald Sikora, Bremen (DE)

(73) Assignee: Sikora AG, Bremen (DE)

( * ) Notice: Subject to any disclaimer, the term of this patent is extended or adjusted under 35 U.S.C. 154(b) by 252 days.

(21) Appl. No.: 14/441,420

(22) PCT Filed: Oct. 9, 2013

(86) PCT No.: PCT/EP2013/071016
§ 371 (c)(1),
(2) Date: May 7, 2015

(87) PCT Pub. No.: WO2014/072144
PCT Pub. Date: May 15, 2014

(65) Prior Publication Data
US 2015/0268034 A1    Sep. 24, 2015

(30) Foreign Application Priority Data

Nov. 8, 2012 (DE) .................. 10 2012 021 892

(51) Int. Cl.
     *G01B 11/14*      (2006.01)
     *G01B 11/02*      (2006.01)
     *G01B 11/10*      (2006.01)

(52) U.S. Cl.
     CPC ............ *G01B 11/14* (2013.01); *G01B 11/028* (2013.01); *G01B 11/105* (2013.01)

(58) Field of Classification Search
CPC ...... G01B 11/028; G01B 11/14; G01B 11/105
See application file for complete search history.

(56) References Cited

U.S. PATENT DOCUMENTS

| 3,982,816 A | 9/1976 | Watkins |
| 4,394,683 A | 7/1983 | Liptay-Wagner et al. |
| (Continued) | | |

FOREIGN PATENT DOCUMENTS

| DE | 197 57 067 A1 | 7/1999 |
| DE | 103 60 690 A1 | 7/2005 |
| (Continued) | | |

OTHER PUBLICATIONS

Translation of International Preliminary Report on Patentability dated May 21, 2015.

(Continued)

*Primary Examiner* — Hwa Lee
(74) *Attorney, Agent, or Firm* — Young Basile Hanlon & MacFarlane, P.C.

(57) ABSTRACT

A method for determining the position of at least one edge of an object, in particular a strand, comprises illuminating the object using light from at least one coherent light source, wherein diffraction borders are generated on both geometric boundaries of the shadow caused by the object. The method also includes recording the spatial intensity profile of at least one diffraction border using at least one single or multi line optical sensor, differentiating the at least one recorded intensity profile with respect to location and plotting it using a squared location axis, and comparing the at least one recorded intensity profile, differentiated with respect to location and plotted using a squared location axis, to at least one periodic reference intensity profile. The position of at least one edge of the object is determined on the basis of the completed comparison.

21 Claims, 6 Drawing Sheets

(56) References Cited

U.S. PATENT DOCUMENTS

| | | | |
|---|---|---|---|
| 4,854,707 A | 8/1989 | Ring et al. | |
| 5,015,867 A | 5/1991 | Siegel et al. | |
| 6,922,254 B2 | 7/2005 | Blohm et al. | |
| 7,161,687 B2 * | 1/2007 | Pirinoli | G01B 11/105 356/625 |
| 7,889,327 B2 * | 2/2011 | Sikora | G01B 11/043 356/27 |
| 2002/0044289 A1 * | 4/2002 | Blohm | G01B 11/105 356/635 |
| 2005/0117162 A1 | 6/2005 | Zhao et al. | |

FOREIGN PATENT DOCUMENTS

| | | |
|---|---|---|
| JP | S62149149 A | 7/1987 |
| JP | H06-288723 A | 10/1994 |
| JP | H06288723 A | 10/1994 |
| JP | 2005-224901 A | 8/2005 |
| JP | 2005224901 A | 8/2005 |
| JP | 2007-147368 A | 6/2007 |
| JP | 2010119075 A | 5/2010 |

OTHER PUBLICATIONS

Hans K. Tönshoff, et al., "The use of Fresnel diffraction for the measurement of rotational symmetrical workpieces," SPIE vol. 3784, pp. 334-343 (Denver, Jul. 1999).

Schäfter + Kirchhoff GMBH, "Let There be Shadow, Laser diffraction system for diameter, geometry and edge detection," 4 pages (Hamburg 2007).

Soraya Khodier, "Measurement of wire diameter by optical diffraction," Optics & Laser Technology, vol. 36, pp. 63-67 (Elsevier Ltd. 2003).

Fang Xiaoyong, et al., "Fine structure in Fresnel diffraction patterns and its application in optical measurement," Optics & Laser Technology, vol. 29, No. 7, pp. 383-387 (Elsevier Science Ltd. 1998).

* cited by examiner

METHOD FOR EVALUATING FRESNEL DIFFRACTION BORDER PROFILES

TECHNICAL FIELD

The invention relates to a method for determining the position of at least one edge of an object, in particular of a strand.

BACKGROUND

A strand can be, for example, a cable having a conductor and insulation surrounding the conductor. There is a need to measure such strands, in particular to determine the position or the diameter. An optical measurement of strand-shaped goods is known from EP 0 924 493 B1, for example, in which using coherent monochromatic light, preferably from a laser diode, a shadow of the strand to be measured is projected without imaging optics onto a light sensor. Compared to measurement methods that function using imaging optics, highly accurate measurements can be attained using this method with comparably small dimensions of the arrangement. Diffraction borders are generated on the geometric shadow boundaries of the strand due to the coherent monochromatic radiation of the light source. These geometric shadow boundaries can be determined from the recorded diffraction borders. This is possible, for example, by comparing to a reference diffraction pattern known from diffraction theory. The free parameters of this reference pattern, in particular the extension and the local shift, are varied until an optimal correlation arises between the reference diffraction pattern and the profile of the measured diffraction border intensity. This correlation is, however, computationally relatively intensive. Alternatively, the position of characteristic feature points of the diffraction border, for example local intensity maximums and minimums, are evaluated, and the position of the geometric shadow boundary can be concluded therefrom.

SUMMARY

Whereas the correlation method is, as stated, very computationally intensive, evaluating the characteristic feature points of the diffraction border is fast, and attains outstanding measurement accuracy in most application cases. However, because the analysis is restricted to a limited number of characteristic feature points of the diffraction border, erroneous results can occur when these characteristic feature points are disturbed. This can be the case, for example, with significant contamination of the optical system, or with the measurement of transparent or very thin strands. Thus, there can be disturbances of the diffraction borders, and therefore also to the characteristic feature points, due to light portions that penetrate through the transparent material to be measured. In the case of very thin strands, there can be disturbances due to a mutual interference of both diffraction borders.

According to the teachings herein a method for determining the position of at least one edge of an object that delivers reliable measurement results even in the event of disturbances of the diffraction border is described. In doing so, the method attains high measurement and evaluation speed.

A first aspect of a method for determining the position of at least one edge of an object, in particular a strand, described herein comprises the steps of illuminating the object using light from at least one coherent light source, wherein diffraction borders are generated on both geometric boundaries of the shadow caused by the object, recording the spatial intensity profile of at least one diffraction border using at least one single or multi line optical sensor, differentiating the at least one recorded intensity profile with respect to location and plotting it over a squared location axis, comparing the at least one recorded intensity profile, differentiated with respect to location and plotted over a squared location axis, to at least one periodic reference intensity profile, and determining the position of at least one edge of the object on the basis of the completed comparison.

A second aspect of a method for determining the position of at least one edge of an object, in particular a strand, described herein comprises the steps of illuminating the object using light from at least one coherent light source, wherein diffraction borders are generated on both geometric boundaries of the shadow caused by the object, recording the spatial intensity profile of at least one diffraction border using at least one single or multi line optical sensor, differentiating the at least one recorded intensity profile with respect to location, comparing the at least one recorded intensity profile, differentiated with respect to location, to at least one reference intensity profile, which results from a periodic function, if this has a period having a substantially inverse linear dependency on the location, and determining the position of at least one edge of the object on the basis of the completed comparison.

A third aspect of a method for determining the position of at least one edge of an object, in particular a strand, described herein comprises the steps of illuminating the object using light from at least one coherent light source, wherein diffraction borders are generated on both geometric boundaries of the shadow caused by the object, recording the spatial intensity profile of at least one diffraction border using at least one single or multi line optical sensor, comparing the at least one recorded intensity profile to at least one periodic reference intensity profile, which results from a periodic function, if this has a period having a substantially inverse linear dependency on the location, and, if the function is integrated over the location, determining the position of at least one edge of the object on the basis of the completed comparison.

The geometric shadow boundaries represent direct information about the position of the object. Here, determining the position of the object also comprises, for example, determining the position of only one edge of the object. The invention uses a measurement set-up as is substantially known from EP 0 924 493 B1. The object, or respectively strand, can have a nearly circular cross-section. It can be a cable, in particular a cable with at least one conductor and at least one insulation cladding surrounding the conductor. Here, the at least one coherent light source can emit, in particular, monochromatic light. The light source can be a laser, in particular, a diode laser. The optical sensor can be, for example, a CCD or CMOS sensor, in particular a CCD or CMOS line sensor.

According to the teachings herein, the Fresnel diffraction profiles of the light intensity, which in the case of a coherent light source appear on a sensor located at not too great a distance behind the object, are evaluated. The diffraction profiles can be described mathematically using the Fresnel integrals. However, no closed analytical solution exists for these integrals from which the diffraction border reference intensity profiles can be calculated simply. As already mentioned, a correlation method is known from EP 0 924 493 B1, in which the measured diffraction border profiles are compared with reference profiles. This method is, however, impractical for measurement accuracies in the sub-micron range because a very large number of reference profiles must be saved.

According to the teachings herein, the position of the object is determined on the basis of a comparison, or respectively a correlation, between at least one recorded intensity profile and at least one reference intensity profile. A specific geometric shadow boundary and thus a specific position of the object can be assigned, for example empirically, to the reference intensity profile. All three aspects of the method described above are based on the common realization that the period of the recorded diffraction border profiles has an inverse linear, or respectively nearly inverse linear dependency on the location coordinate of the sensor used. Thus, the period decreases with $1/(x-x_{geo})$, where x is the location and $x_{geo}$ is the position of the geometric shadow boundary. The measured intensity profiles can therefore be compared with reference intensity profiles that also have such inverse linear, or respectively nearly inverse linear dependency, of their period on the location coordinate. The location coordinate x, in particular, is then squared in the argument of the functions of the reference intensity profiles.

Furthermore, all three aspects of the method described above are based on the common realization that a periodic function, which very nearly approximates in particular a sine function, can be generated from the recorded diffraction border profile I(x) produced at an edge, by differentiating, or respectively deriving with respect to the location, on the one hand, and by plotting over a squared x-axis on the other. The latter behavior (that is, plotting over a squared location axis yields a periodic profile) suggests that the location x appears squared in the argument of the periodic function $$\frac{dI}{dx} = F(V(x)),$$

thus the following applies: $V(x)=x^2$. With approximation using a sine function, the following applies for the derived diffraction border profile at an edge:

$$\frac{dI}{dx} \approx A \cdot \sin(kx^2 + \varphi)$$

Correspondingly using a sine function, a reference profile $I_{Ref}(x)$ can be generated, which corresponds very well with the recorded intensity profile. For this purpose, the location x is squared in the argument of the sine function, and then the function values are integrated over the location:

$$I_{Ref}(x) = \int \sin(kx^2 + \phi) dx \qquad \text{Eq. (1)}$$

With the first aspect described above, the two aforementioned operations (differentiating with respect to the location and plotting over a squared location axis) are used on the recorded intensity profile, and this is compared directly to a periodic function, for example a sine function. With the second aspect described above, the first of the two operations, namely differentiating with respect to the location, is used on the recorded intensity profile. The thusly obtained intensity profile is compared to a reference intensity profile, as results for example from a sine function, in which the location x in the argument is squared. In this case, the reference intensity profile is a profile whose period has an inverse linear dependency on the location. In contrast to the second aspect, with the third aspect described above, the differentiation of the recorded intensity profile with respect to the location is replaced by an integration over the location, with the creation of the reference intensity profile. Thus with the third aspect, the reference intensity profile is consequently generated corresponding to equation (1). These three aspects are described in more detail in the following with reference to FIGS. 6 to 8.

It is significant that all three aspects are based on the same realization. The difference lies merely in whether and to what extent the measured intensity profile, before the comparison, is subjected to an operation, in particular to a mathematical operation. The reference intensity profile used for the comparison is then selected correspondingly. It is understood that the reference intensity profiles, in particular with the second and third aspects described above, do not actually need to be subjected to one or both inverses for the first and second operation. Rather, they can already be present as stored reference profiles for methods according to the teachings herein. They correspond however to functions that, assuming a periodic function, for example a periodic sine function, would result from applying one or both mathematical inverse functions. It is also understood that one or all of the method steps according to one or more, in particular all three aspects, can also be performed in parallel, i.e., in sections or completely simultaneously.

A periodic function, for example a sine function, is significantly easier to evaluate than other functions, in particular in the case of transparent or very thin objects, in that the at least one recorded intensity profile is compared, or respectively correlated, to a periodic reference intensity profile, in particular a sinusoidal reference intensity profile. In particular, if the originally recorded intensity profile has significant disruptions, which would complicate the evaluation or even make it impossible, using the first derivative of the intensity profiles with respect to location and plotting over a squared location axis allows a profile to be generated that very nearly approximates a sine profile. Relevant information of this sine profile, such as phasing and frequency, can be extracted even in the presence of a strongly disrupted, recorded diffraction border profile. As stated, embodiments of the invention are based on the realization that the period of the intensity fluctuations in the Fresnel diffraction pattern of an edge changes inverse linearly with the location, and in particular, with the distance to the geometric shadow boundary. Based on this realization, it is possible at runtime to generate the reference profiles needed for the correlation. The correlation is therefore not bound to reference profiles stored previously for discrete edge positions, but rather, can be performed with the necessary positional accuracy for any arbitrary edge position. This allows the desired high measurement accuracy for the diameter measurement to be attained.

Diffraction border reference profiles, which very nearly approximate the theoretically exact profile, can be generated (at runtime) in that the following equation is used for the derivative of the light intensity I with respect to location:

$$\frac{dI_{Ref}}{dx} = \sin\left[2\pi \cdot \frac{1}{T(\Delta x)} \cdot (x - x_{geo}) + \frac{\pi}{4}\right], \qquad \text{Eq. (2)}$$

where T is the period and $x_{geo}$ is the position of the geometric shadow boundary of the shadow caused by the object. For the location dependent period, $T(\Delta x)$, the following applies: $T(\Delta x) = T0/(x-x_{geo})$, where T0 is a constant, described later.

A reference intensity profile to be compared to the measured intensity profile is obtained in that, for example, the profile is numerically integrated according to equation (2). The evaluation can be performed in this manner simpler and faster than known techniques. This is true, in particular also in the event of disturbances of the diffraction borders, which occur for example in the case of transparent strands or very thin strands (diameters of less than 1 mm, in particular less than 0.5 mm).

During the production of cables, an insulation cladding is applied onto the electrical conductor using, for example, an extrusion process. In doing so, high production speeds are attained. It is generally necessary to check the position of the object, and thus also to check that the insulation is properly applied. The checking preferably occurs during the production, thus online. In particular, the object can be conveyed along its longitudinal direction, while the position of the object is continuously determined. Therefore, according to the teachings herein, there is a continuous illumination of the object, and recording of the intensity profiles of the diffraction borders and the evaluation of the same. In this way, online monitoring of the position and/or the diameter is possible. The measurement of the intensity profiles and the evaluation according to the teachings herein can occur, for example, at regular intervals or even as continuously as possible.

Various types of information can be acquired using the comparison herein. For example, for determining the diameter of the object, both geometric shadow boundaries of the shadow caused by the object can be determined. The object casts a shadow when it is illuminated with light. The two shadow boundaries generated by an object with an illumination occurring, in particular perpendicular to its longitudinal direction, provide important information about the diameter of the object. Due to the diffraction effects, the geometric shadow boundaries cannot be read directly on the optical sensor, but rather must be evaluated in the manner described herein. A geometric shadow boundary can be detected in each case from a diffraction border. If both diffraction borders arising with an illumination of the object are evaluated, both geometric shadow boundaries, or respectively their positions, can be determined. Basically, the two diffraction borders of the two diffractive edges of the illuminated object can be evaluated separately or together. In particular, there can be a correlation, or respectively a comparison, of a diffraction border in each case to a corresponding reference intensity profile. Alternatively, the two diffraction borders recorded metrologically can also be correlated, or respectively compared together, to a corresponding reference intensity profile for both edges of the object.

The following mathematical approximation can be given for the derivative with respect to location of the recorded diffraction border profile:

$$\frac{dI}{dx} \approx A \cdot \sin\left[2\pi \cdot \frac{1}{T_0} \cdot (x - x_{geo})^2 + \frac{\pi}{4}\right]$$

where
I is the light intensity;
A is the amplitude coefficient;
x is the location axis (position);
$x_{geo}$ is the geometric shadow boundary position; and
$T_0$ is the period of the sine profile.

The period $T_0$ depends on the position of the diffractive edge of the object in the measurement space. For example, by correlating the derivative $$\frac{dI}{dx}$$

of the measured diffraction border profile of the light intensity I with respect to location to reference sine profiles according to Eq. (2), in that the free parameters $T_0$ and $x_{geo}$ are varied, the geometric shadow boundary position $x_{geo}$ and the period $T_0$ can be determined. Thus, a two-dimensional correlation must be performed.

If a location dependent frequency $f = 1/T_0 \cdot (x - x_{geo})$ is introduced, the geometric shadow boundary position $x_{geo}$ can be interpreted as a phase shift $\phi$ of the sine profile:

$$\frac{dI}{dx} \approx A \cdot \sin\left[2\pi \cdot \underbrace{\frac{1}{T_0} \cdot (x - x_{geo})}_{f(\Delta x)} \cdot (x - x_{geo}) + \frac{\pi}{4}\right]$$

$$\frac{dI}{dx} \approx A \cdot \sin\left[2\pi \cdot f(\Delta x) \cdot x \underbrace{- 2\pi \cdot f(\Delta x) \cdot x_{geo} + \frac{\pi}{4}}_{=\varphi(\Delta x)}\right]$$

If the frequency $f_0 = 1/T_0$ and the phase shift $\phi$ of the recorded diffraction border profile are determined, this yields a direct conclusion about the position $x_{geo}$ of the geometric shadow boundary, on the one hand, and the position of the object causing the diffraction in the measurement space on the other hand. If this evaluation is performed for both recorded diffraction borders, then from this the diameter of the object and the position of the object in the measurement space can be determined.

As already mentioned, the at least one periodic reference intensity profile can be a sinusoidal reference intensity profile, or respectively the periodic function can be a sine function. A particularly simple and fast evaluation is then possible. However, it is also possible that the at least one periodic reference intensity profile is a periodic rectangular, triangular, or trapezoidal profile and/or that the periodic function is a periodic rectangular, triangular or trapezoidal function. Additionally, a binary signal can be generated from the recorded intensity profile, using amplitude limiting, before the comparison to the reference intensity profile. For binarization, an intensity threshold can be defined, for example, after the derivation with respect to the location and/or after the scaling over the squared location axis. Insofar as the intensity signal lies above the threshold, the binary intensity signal is set to 1, and if the intensity signal lies below the threshold, the binary intensity signal is set to 0. Such a rectangular profile simplifies and accelerates the evaluation because such digital signals are easier to process. This is true in particular with the processing of a digital phase locked loop.

In the course of the comparison according to the teachings herein, a parameter of the at least one recorded intensity profile and/or of the at least one reference intensity profile that characterizes the respective geometric boundary of the shadow caused by the object can be varied until the best possible correspondence of the intensity profiles compared with each other. In the scope of the correlation method, the variation of the parameter characterizing the geometric boundary of the shadow caused by the object can begin in each case with the value, which, with an immediately prior variation, has led to a best possible correspondence to the reference intensity profile. Thus with this design, the comparison is begun in each case with the parameter which in the last measurement best corresponded to the reference intensity profile. The fact that the position and the diameter of the object and thus the decisive parameters of the intensity profile change only slightly between subsequent measurements, in particular taken in short distances after one another, is utilized here. Therefore, the starting point for the comparison lies already relatively close to the desired result. The time and computational expenditure associated with the evaluation can thereby be reduced. With the first comparison, when no "last parameter" is present, the comparison can begin with a previously defined default value.

The phasing, in particular, of the at least one recorded intensity profile and/or the at least one reference intensity profile, can be varied in the course of the comparison as the parameter characterizing the respective geometric boundary of the shadow caused by the object. With the first aspect of the method, for example, this variation can occur based on the recorded intensity profile differentiated with respect to location, until a sine function results. This is the case, according to the equations above, when the origin of the location axis corresponds to the geometric shadow boundary. Thus, the phasing correlates directly to the geometric shadow boundary. Using correlation, a sine reference profile can be sought that corresponds optimally with this resulting sine function. From this, the absolute value of the geometric shadow boundary can be determined. Also in the course of the comparison, the frequency of the at least one recorded intensity profile and/or the at least one reference intensity profile can be varied. The frequency correlates directly to the position of the object in the measurement space of the optical sensor.

For determining the diameter of the object, in particular, it can be necessary to consider both the geometric shadow boundaries as well as the position, in particular the distance of the object from the sensor. This distance is subject to natural fluctuations, in particular in the event of an advancement of the object, such that it can be necessary to continuously monitor the distance. As explained, insofar as both the geometric shadow boundary and the position are to be determined using correlation, a two-dimensional comparison, or respectively a two-dimensional correlation must be performed. This is relatively computationally intensive and therefore poses considerable challenges, particularly in the case of high production speeds. Therefore, the object may be illuminated with light from at least a second coherent light source, the main beam direction of which is substantially perpendicular to the main beam direction of the first coherent light source, wherein diffraction borders are also generated by the second coherent light source on both geometric boundaries of the shadow caused by the object. The spatial intensity profile of at least one diffraction border generated by the second coherent light source is recorded with at least one second single or multi line optical sensor, and from this the distance of the object from the first optical sensor is determined. In this manner, the position of the object in the measurement space is determined particularly easily, in particular from the diffraction borders generated by the second light source. The frequency $f_0=1/T_0$ of the diffraction border profile evaluated is thus already known. The required comparison, or respectively the required correlation, would then be limited to the phase shift, or respectively the geometric shadow boundary. This is however, only a one-dimensional correlation, which is correspondingly less computationally intensive.

The comparison, or respectively the correlation of the at least one recorded intensity profile to the reference intensity profile can be performed using a phase locked loop (PLL). Using such a phase locked loop a required variation of the frequency and/or the phasing can be determined quickly in order to obtain a best possible correspondence of the recorded, and possibly mathematically processed intensity profile, with a periodic reference profile, in particular, with a sinusoidal reference profile. According to a further design, the comparison of the at least one recorded intensity profile to the reference intensity profile can also occur using a Fourier analysis.

The main beam direction of the at least one coherent light source can be substantially perpendicular to the longitudinal direction of the object. The at least one coherent light source can be substantially point-like. Alternatively, or additionally, the at least one coherent light source can illuminate the object with a fan-shaped light beam. If multiple light sources are present, this can apply in each case for all light sources. Furthermore, no optical elements deforming or deflecting the light radiation may be present between the at least one coherent light source and the object and/or between the object and the at least one optical sensor. In particular, with this design, no imaging optics are present between the at least one coherent light source and the object and/or between the object and the at least one optical sensor. This results in a simpler and more compact set-up, while the evaluation methods according to the teachings herein at the same time allow a reliable determination of the position and/or the diameter of the object.

The at least one optical sensor can be, as mentioned, a line sensor. The at least one optical sensor can be arranged opposite the at least one coherent light source. In addition, the measurement axis of the at least one optical sensor can be substantially perpendicular to the main beam direction of the at least one coherent light source. The measurement axis is defined here, in particular, by the line direction of the sensor. Naturally, the use of a multi-line sensor (area array sensor) is also possible. Then, a plurality of lines is aligned perpendicular to the main beam direction of the light source. With area array sensors, each line can be evaluated individually.

The object can be transparent at least to some extent, at least for the light of the at least one coherent light source. Also, the object can have a diameter of less than 1 mm, preferably less than 0.5 mm. As mentioned, the evaluation methods according to the teachings herein are advantageous in particular with transparent and very thin strands, which generate errors using conventional evaluation methods.

Methods described herein use nearly the entire information content of the diffraction border, thus are narrow band. Disturbances of the diffraction border, as described initially, have practically no or only minor influence on the result of the analysis, in particular the evaluation of the geometric shadow boundaries, because the frequency spectrum of the disturbances lies predominantly outside of the narrow band filter provided by the evaluation. With a method according to the teachings herein, the determination of the shadow boundaries, and with it the diameter, is significantly more precise and less susceptible to disturbances than known techniques. The measurement accuracy and the reliability are increased. Furthermore, the application range of such evaluation methods is expanded and is also equipped for measuring transparent products, for instance glass fibers, bars and hoses, or the like.

BRIEF DESCRIPTION OF THE DRAWINGS

An exemplary embodiment of the invention is explained in the following in more detail using the drawings in which.

In the figures, the same reference numbers refer to the same objects unless indicated otherwise.

DETAILED DESCRIPTION

Figure 1:
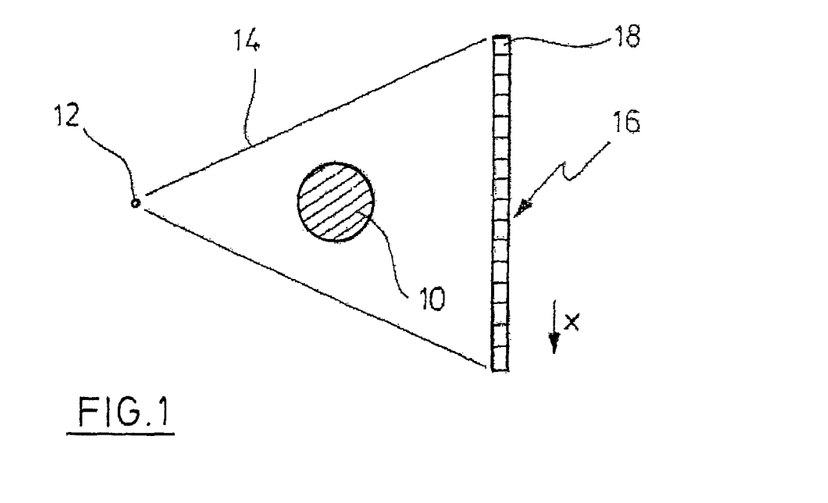
FIG. 1 is schematic diagram of a measurement device that can be used for performing a method according to the invention.

FIG. 1 shows the cross-section of a strand 10, which extends perpendicular to the drawing plane and is conveyed, for example at 10 mm per second up to 30 m per second. The strand 10 may be a cable. The device for producing the strand 10 and for generating its feed motion is not shown, because this is known to the person skilled in the art. The strand 10 can have a diameter of less than 1 mm, preferably less than 0.5 mm. It is also possible that the strand 10 is a transparent strand.

In FIG. 1, a point-like light source 12 is seen on the left side of the strand 10. This can be a laser diode, which generates infrared light for example. The light source 12 is, in particular, point-like in the measurement plane formed by a fan-shaped light beam 14 emitted from the light source 12. The extent of the active zone of the light source 12 in this plane, in particular when the light source is a laser diode 12, can be as small as possible. Perpendicular to this, that is, parallel to the longitudinal axis of the strand 10, there can be a larger extent of the optical active zone of the light source 12, of 0.5 mm for example.

On the side of the strand 10 opposite from the light source 12, an optical sensor 16 is shown, for example a CCD line sensor 16, the longitudinal axis of which, formed by the sensor line, lies in the image plane and runs perpendicular to the main beam direction of the light source 12. The individual sensor elements 18 of the sensor 16 are formed for the purpose of recording the laser light emitted from the light source 12. The strand 10 illuminated by the fan-shaped beam 14 from the light source 12 forms a shadow on the line sensor 16, the extent of which is representative of the diameter of the strand 10. The extent of the shadow is, however, not equal to the diameter of the strand 10 due to widening, fan-shaped beam path. Therefore, the distance from the longitudinal axis of the strand 10 to the line sensor 16 must be considered with the evaluation. The measured shadow extent is to be multiplied by a factor, which is in particular less than 1, derived from the intercept theorem. Because the pseudo shadow aperture varies relative to the center point of the strand cross-section and with the distance between the light source 12 and the strand 10, this dependency must also be considered.

Figure 2:
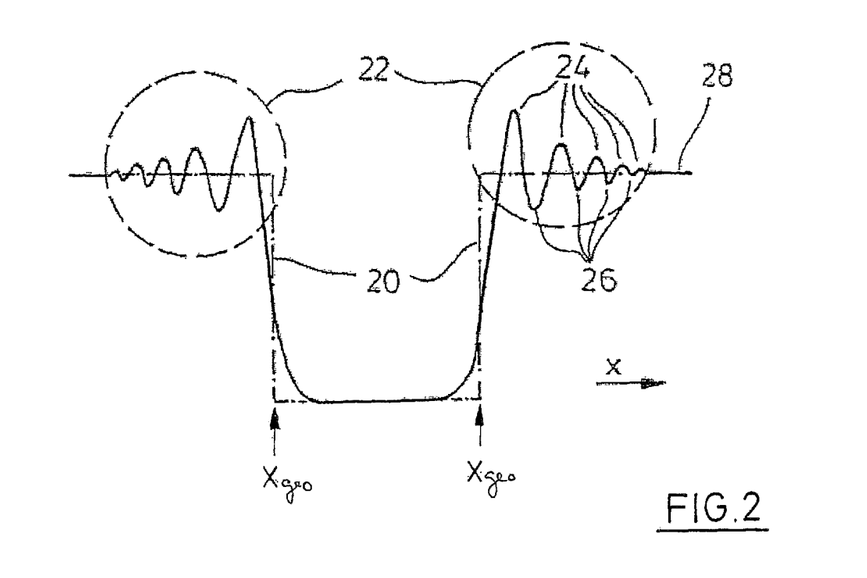
FIG. 2 is an idealized representation of the intensity profile on the optical sensor according to FIG. 1.

The light source 12, in particular a laser diode, emits coherent monochromatic light. The coherent monochromatic light experiences diffraction at the outer edges of the strand 10. This yields an intensity profile on the optical sensor 16, as shown in an idealized manner in FIG. 2. The location axis x runs from left to right in FIG. 2, and from top to bottom in FIG. 1. The profile of the geometric shadow formed by the strand 10, as would appear without the diffraction, is shown in FIG. 2 with a dashed line 20. The thusly formed geometric shadow boundary positions $x_{geo}$ cannot be measured directly on the optical sensor 16 due to the diffraction. Intensity profiles with slowly decaying intensity maximums and minimums, following each other alternating, are registered alongside light deflected into the geometric shadow region to the left, or respectively right of the geometric shadow boundary positions $x_{geo}$. This pattern resulting from runtime differences (interference) is designated as a diffraction border 22. The maximums resulting from overlapping of individual light beams are designated with 24, the minimums caused by extinguishing are designated with 26. The frequency with which the maximums 24 and the minimums 26 follow each other depends on the distance between the diffractive edge of the strand 10 and the measurement plane of the sensor 16. The intensity profile varies in the diffraction border 22 about a central level 28 that would appear without the measurement object.

Figure 3:
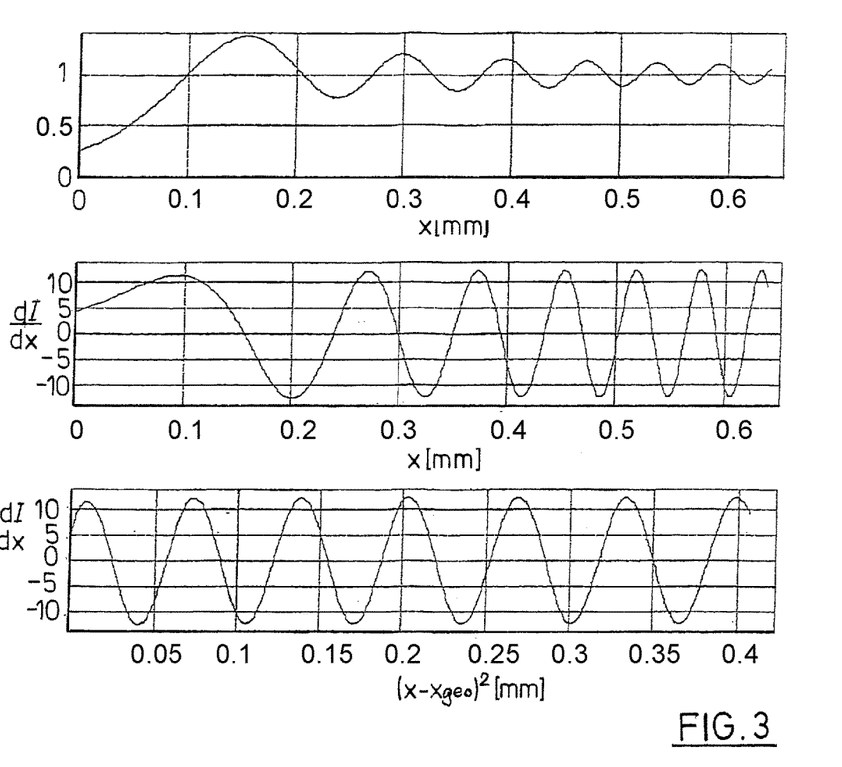
FIG. 3 includes three graphs for illustrating an evaluation method according to the invention.

An evaluation method according to the invention is described in more detail using the graphs shown in FIG. 3. Here, the top graph in FIG. 3 shows a diffraction border from FIG. 2. The intensity I is shown in profile over the location x as it is recorded by the optical sensor 16. In the example shown, the optical sensor 16 has a measurement line with N=300 pixels. The graph seen in the middle in FIG. 3 shows the first derivative of the intensity profile, from the upper graph, with respect to the location. The derivative was calculated here as a differential quotient using the following formula:

$$\frac{dI}{dx} = \frac{I(n+1) - I(n)}{x(n+1) - x(n)} \text{ with } n = 1 \ldots 299$$

The middle graph shows the derivative of the intensity with respect to location plotted over the linear location axis x. This profile is plotted over a squared x-axis, namely $(x-x_{geo})^2$. In particular, the intensity values plotted in the upper graph in FIG. 3 on the y-axis are each assigned a value, as an x-ordinate, which results in each case from their assigned x-value in the upper graph using the function d $(x-x_{geo})^2$. The result of this, shown in the lower graph in FIG. 3, is a nearly sinusoidal signal profile.

This only applies if the geometric shadow boundary $x_{geo}$ was already found, and the lower graph in FIG. 3 is plotted using the geometric shadow boundary position $x_{geo}$ as the origin. If the geometric shadow boundary is not yet known, which regularly is the case in particular at the start of the evaluation, then there is no sinusoidal profile as a result in the lower graph from FIG. 3. What is more, the frequency of the profile plotted according to the lower graph from FIG. 3 then still shows a location dependency, in particular the frequency increases with the location. For the evaluation herein, in general, for the profile plotted according to the lower graph in FIG. 3 that is not yet sinusoidal, the phase shift $(x-x_{geo})$ is varied until a (periodic) sine profile results. The required phase shift is the sought-after geometric shadow boundary position $x_{geo}$, which however at this point in time is not yet known as an absolute value. This sine profile, already found and shown in FIG. 3, is therefore compared to, for example, a group of sinusoidal reference profiles until an optimal correspondence is found between the recorded intensity profile and a sinusoidal reference profile. Then, the absolute value of the geometric shadow boundary is also determined. In the course of this evaluation, the correlation and the shift of the phase shift $(x-x_{geo})$ occur in parallel, as explained below in more detail. Possibly, the frequency must also be varied in order to also know the distance of the strand 10 from the optical sensor 16. If the frequency and the phase shift of the intensity profile shown in the lower graph from FIG. 3 are known, the diameter of the strand 10 can be determined from this, as explained above.

Figure 4:
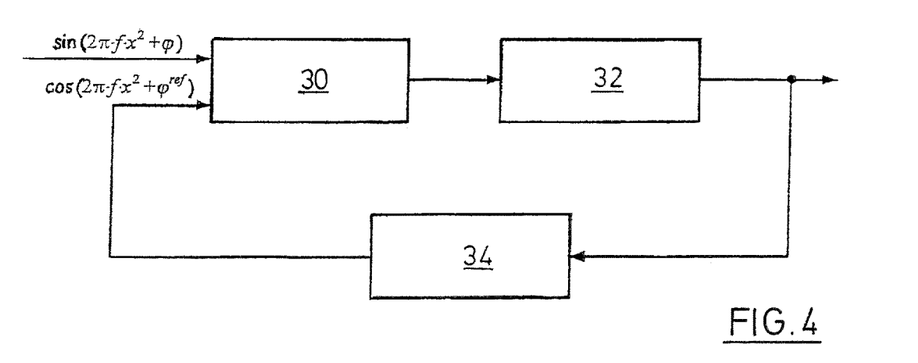
FIG. 4 is a schematic representation of a phase looked loop according to the teachings herein.

The comparison can occur here in a particularly simple manner using a phase locked loop (PLL). A corresponding measurement set-up is shown in FIG. 4. A multiplier is shown with reference number 30, and a low pass filter is shown with reference number 32. A voltage controlled oscillator (VCO) is shown with reference number 34. Using the phase locked loop shown in FIG. 4, a required frequency change and/or a required phase shift can be determined in a known manner for an optimal comparison between the recorded and mathematically processed intensity profile and a sinusoidal reference profile. The function of phase locked loops is known to the person skilled in the art, so that this is not explained here in more detail. For further simplification of the evaluation it is also possible to digitize the signal shown in the lower graph in FIG. 3 into a rectangular profile, and to supply it to a digital phase locked loop.

Figure 5:
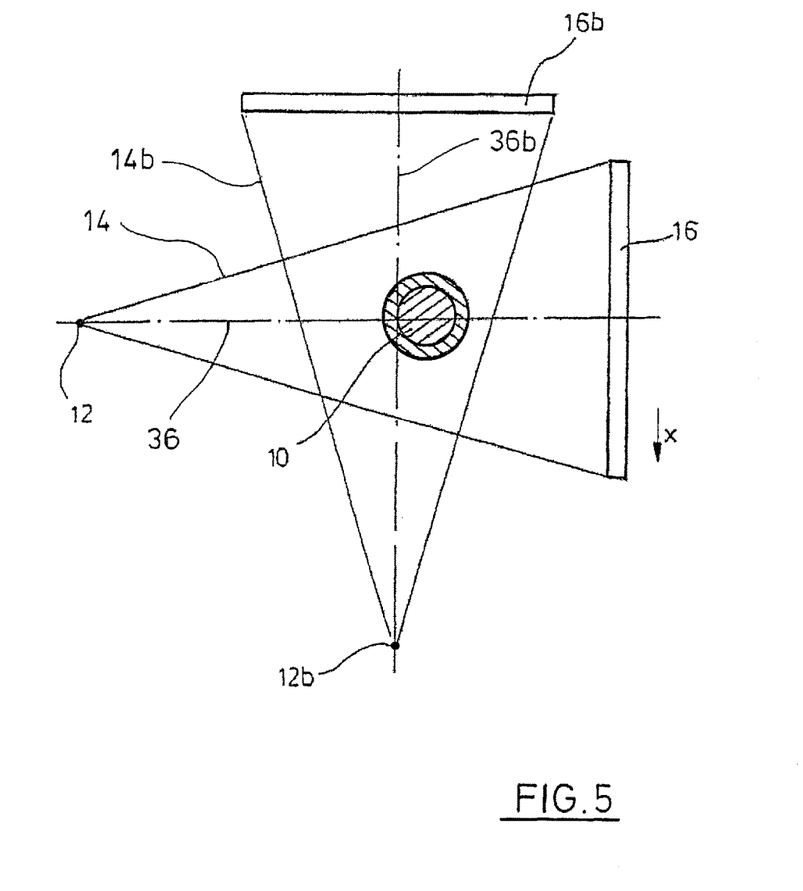
FIG. 5 is a further design of a device for performing a method according to the invention.

FIG. 5 shows a further design of a device for performing a method according to the invention. A second coherent monochromatic point-like light source 12b, for example also a laser diode, is shown, which also generates a fan-shaped light beam 14b. It can be recognized in FIG. 5 that the main beam direction 36b of the light source 12b is perpendicular to the main beam direction 36 of light source 12. A second optical sensor 16b, for example also a CCD line sensor, records the coherent monochromatic light emitted from the second light source 12b. Here, the measurement axis formed by the line of the line sensor 16b lies perpendicular to the main beam direction 36b of the second light source 12b.

Using this device, not only the diameter of the strand 10 can be measured at two locations, but in addition the distance between the strand 10 and the line sensor 16, or respectively the line sensor 16b, can be determined. This distance is subjected to natural fluctuations. The intensity profiles in the diffraction borders on both sides of the strand shadow projected onto the receiving lines are nearly symmetrical. Thus, from the positions of feature points located mirror-imaged across from each other in the left, or respectively right, diffraction border, the center position of the projected object can be concluded. The strand 10 is located on the connecting line between this position and the laser diode 12. A corresponding connecting line can be drawn for the measurement arrangement of the light source 12b rotated by 90°. The point of intersection of the two lines represents the central position of the strand 10 in the measurement space. Thus, the distance to the respective line sensor 16, or respectively 16b, is known. Because this distance, as explained above, is directly related to the frequency of the intensity profile shown in the lower graph of FIG. 3, with the use of this measurement arrangement for the intensity profile shown in the lower graph from FIG. 3 only the phase shift still must be determined. This simplifies the evaluation.

As further seen directly from the drawings, there are no optical elements deforming or deflecting the light radiation, in particular, imaging optical elements, present between the light sources 12, 12b and the strand 10 on one side, and between the strand 10 and the optical sensors 16, 16b on the other. The set-up is thereby further simplified.

Figure 6:
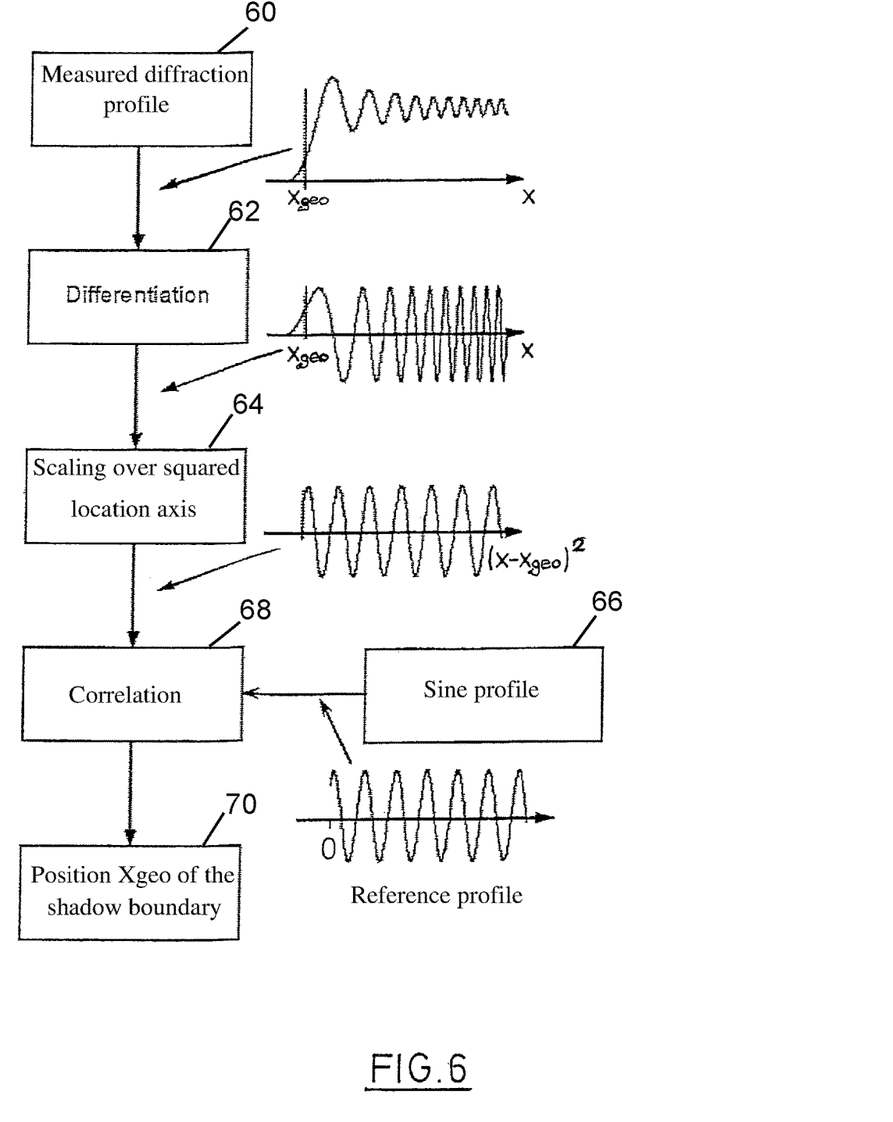
FIG. 6 is a diagram for illustrating the first aspect of a method according to the invention.

FIG. 6 shows a diagram illustrating the first aspect of a method according to the invention. As can be seen, the method starts at step 60 on the basis of a measured diffraction profile, as shown for instance in the upper graph in FIG. 3. In the next step 62, there is a differentiation with respect to location, wherein a profile results, as is also shown in the center graph in FIG. 3. Then, there is a scaling over a squared location axis $(x-x_{geo})^2$ at step 64, wherein generally initially there is not yet the sinusoidal profile shown in FIG. 6, or respectively in the lower graph in FIG. 3, as explained above. In the course of the evaluation, next a sinusoidal reference profile 66 is compared at a correlation step 68 to the measured diffraction profile until there is an optimal correspondence. Here, the periodic sinusoidal reference profile 66 is sought which optimally corresponds with the mathematically processed, measured diffraction profile, as explained above. In parallel, the parameter $x_{geo}$ of the squared location axis is updated 70 (depending on where the zero point of the reference profile lies in the correlation process). The correlation 68 can occur using, for example, a phase locked loop (PLL). The phase shift that occurred can be determined in the course of the correlation 68. This phase shift corresponds, as explained above, to the sought-after geometric shadow boundary $x_{geo}$.

Figure 7:
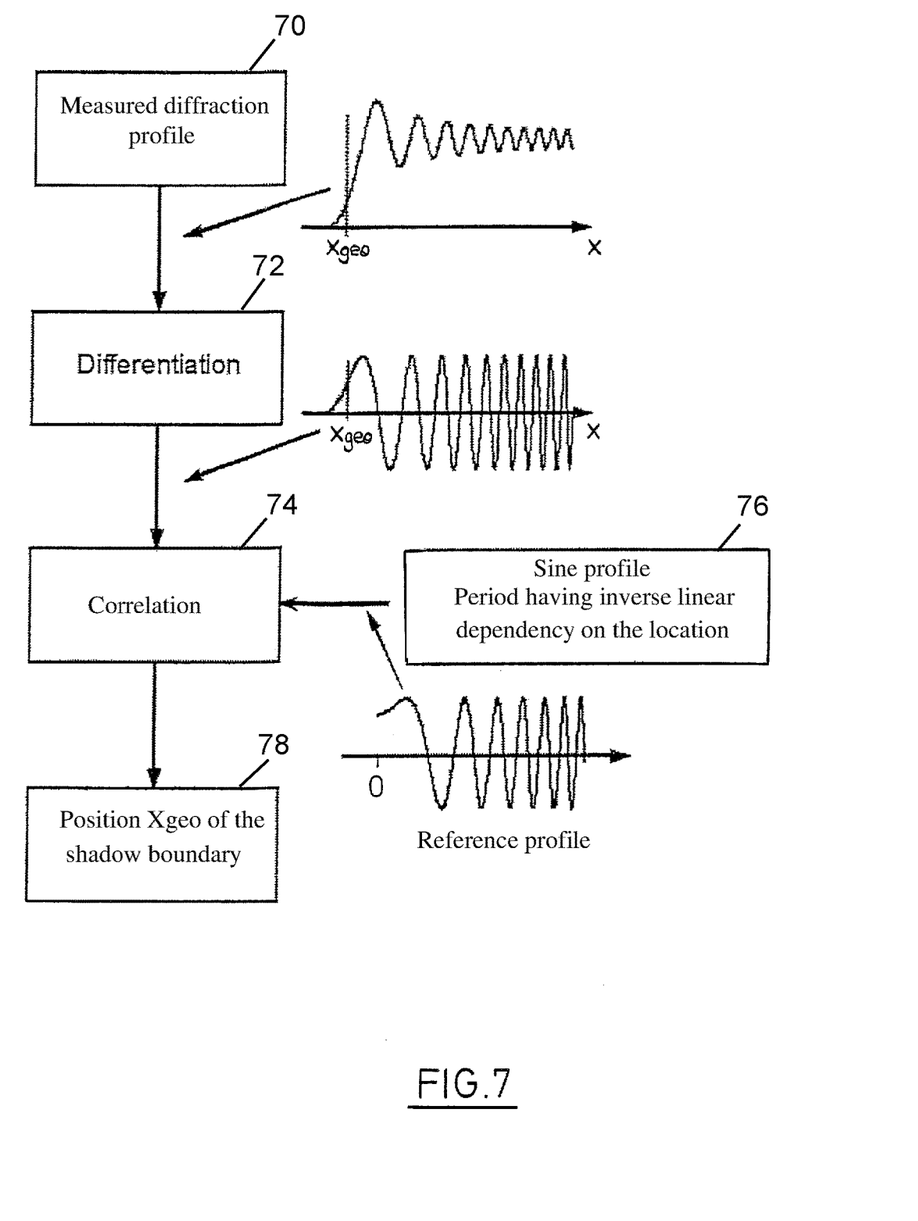
FIG. 7 is a diagram for illustrating the second aspect of a method according to the invention.

The diagram in FIG. 7 illustrates the second aspect of a method according to the invention. As can be seen, this method also starts with a measured diffraction profile, as explained with FIG. 6, at step 70. Furthermore, here also, there is initially a differentiation 72 with respect to location, as explained with FIG. 6. However, with the second aspect illustrated in FIG. 7, there is a correlation step 74 of this differentiated measured diffraction profile to a reference profile 76, which in this present example is a sine profile plotted over the location in such a manner that its period is substantially inversely linearly dependent on the location. In the course of this correlation step 74, a reference profile 76 is again sought that best fits to the measured and mathematically processed diffraction profile. On this basis, the absolute value of the geometric shadow boundary position $x_{geo}$, determined, for example empirically with respect to the reference profiles, and stored, can again be determined at step 78.

Figure 8:
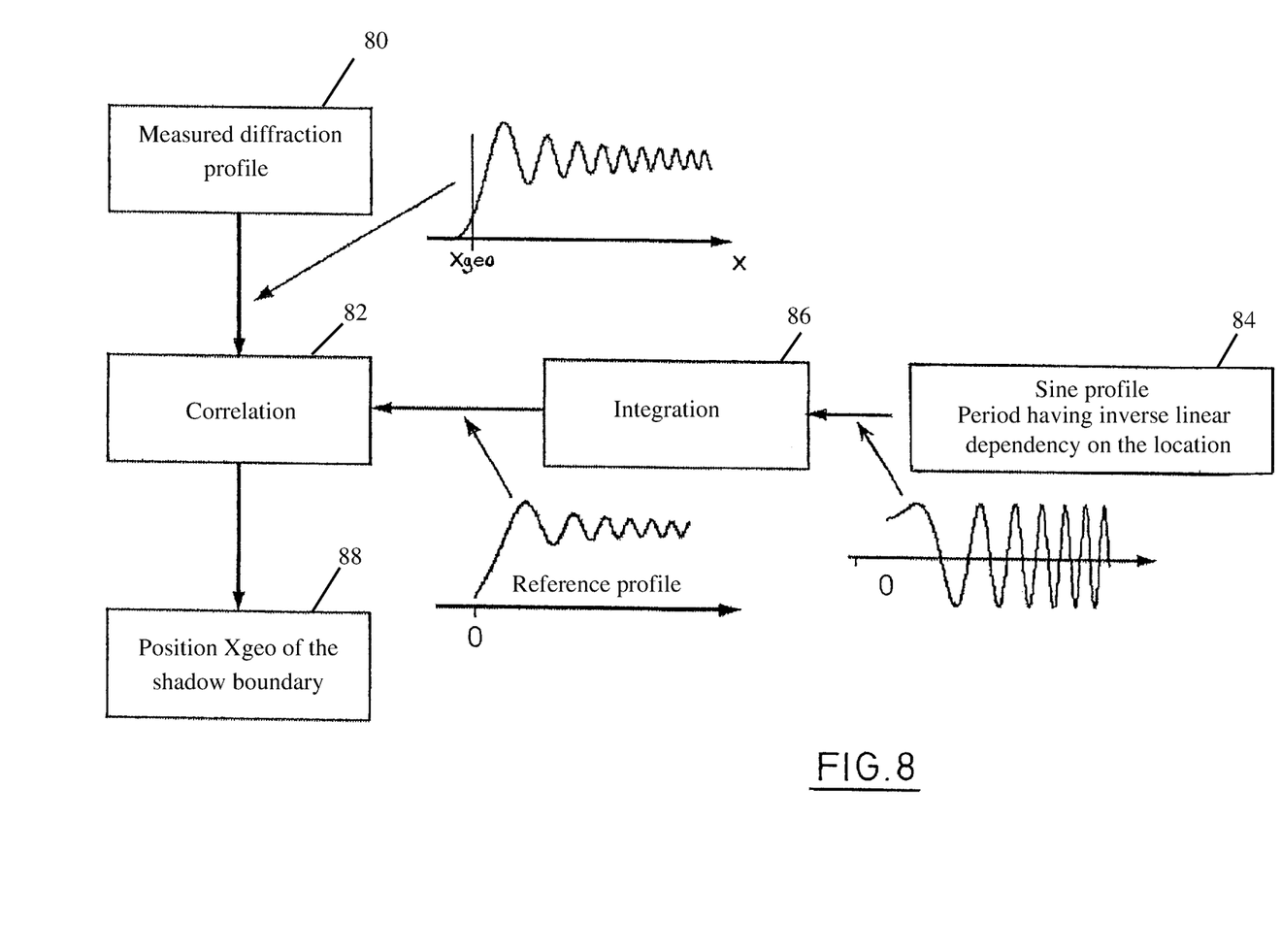
FIG. 8 is a diagram for illustrating the third aspect of a method according to the invention.

FIG. 8 shows a diagram for illustrating the third aspect of a method according to the invention. This method also starts with a measured diffraction profile, as explained for FIG. 6 above, at step 80. However, this reference profile according to the method illustrated in FIG. 8 is not processed mathematically in the manner explained above. Instead, this measured diffraction profile is correlated directly to a reference profile at step 82. This reference profile is obtained from a sine profile 84 plotted in such a manner that its period is inversely linear dependent on location that is then integrated 86 over the location. Again, then in the course of the correlation 82, a reference profile is sought that optimally corresponds with the measured diffraction profile. From this, again the absolute value of the geometric shadow boundary position $x_{geo}$, for example empirically determined with respect to the reference profile, and stored, can be determined at step 88.

From FIGS. 6 to 8, it is again clear that the three aspects of the method are based on the same idea. That is, using two operations, or respectively their inverses, sine profiles can be created from the measured diffraction profiles, or respectively vice versa. This fundamental idea simplifies and accelerates the evaluation of the diffraction pattern according to the teachings herein, as explained above.

The invention claimed is:

1. A method, comprising:
    illuminating an object using light from at least one coherent light source, wherein diffraction borders are generated on geometric boundaries of a shadow caused by the object;
    recording a spatial intensity profile of at least one of the diffraction borders using at least one single or multi line optical sensor;
    differentiating the spatial intensity profile with respect to location and plotting the spatial intensity profile over a squared location axis;
    comparing the spatial intensity profile, differentiated with respect to location and plotted over the squared location axis, to at least one periodic reference intensity profile; and
    determining a position of at least one edge of the object on the basis of the comparing.

2. The method according to claim 1, further comprising:
    conveying the object along its longitudinal direction while continuously determining the position of the at least one edge of the object.

3. The method according to claim 1, wherein at least one of:
    the at least one periodic reference intensity profile is a sinusoidal reference intensity profile, or
    the at least one periodic reference intensity profile results from a periodic function, the periodic function being a sine function.

4. The method according to claim 1, wherein at least one of:
    the at least one periodic reference intensity profile is a periodic rectangular, triangular or trapezoidal profile, or
    the at least one periodic reference intensity profile results from a periodic function, the periodic function being a periodic rectangular, triangular or trapezoidal function.

5. The method according to claim 1, further comprising:
    before the comparing, generating a binary signal from the spatial intensity profile using amplitude limiting.

6. The method according claim 1, wherein comprising the spatial intensity profile comprises:
    varying a parameter of the at least one of the spatial intensity profile or the at least one periodic reference intensity profile that characterizes at least one of the geometric boundaries of the shadow caused by the object to reach a best possible correspondence of the spatial intensity profile to a reference intensity profile of the at least one periodic reference intensity profile.

7. The method according to claim 6, wherein varying the parameter begins in each case with a value that, with an immediate preceding variation, has led to the best possible correspondence to the reference intensity profile.

8. The method according to claim 1, wherein comparing the spatial intensity profile comprises:
    varying at least one of a phasing of the spatial intensity profile or the at least one periodic reference intensity profile.

9. The method according to claim 1, wherein comparing the spatial intensity profile comprises:
    varying at least one of a frequency of the spatial intensity profile or the at least one periodic reference intensity profile.

10. The method according to claim 1, wherein determining the position of at least one edge of the object comprises determining a respective position of each of two edges of the object using a respective one of two geometric boundaries of the shadow caused by the object.

11. The method according to claim 1, further comprising:
    determining a distance of the object from the at least one single or multi line optical sensor.

12. The method according to claim 11, wherein the at least one coherent light source comprises a first coherent light source and a second coherent light source,
    wherein illuminating the object comprises illuminating the object using light from the second coherent light source having a main beam direction substantially perpendicular to a first beam direction of the first coherent light source, and
    wherein recording the spatial intensity profile of at least one of the diffraction borders comprises recording a first spatial intensity profile of a first diffraction border of a first shadow generated by the first coherent light source and recording a second spatial intensity profile of a second diffraction border of a second shadow generated by the second coherent light source, the method further comprising:
    determining a distance of the object from a first optical sensor of the at least one single or multi line optical sensor using the second spatial intensity profile.

13. The method according to claim 1, wherein comparing the spatial intensity profile uses a phase locked loop (PLL).

14. The method according to claim 1, wherein comparing the spatial intensity profile uses a Fourier analysis.

15. The method according to claim 1, wherein a main beam direction of each coherent light source of the at least one coherent light source is substantially perpendicular to a longitudinal direction of the object.

16. The method according claim 1, wherein at least one of: the at least one coherent light source is substantially point-like or the object is illuminated using a fan-shaped light beam.

17. The method according to claim 16, wherein at least one of:
    no optical elements deforming or deflecting light radiation are present between the at least one coherent light source and the object, or
    no optical elements deforming or deflecting light radiation are present between the object and the at least one single or multi line optical sensor.

18. The method according to claim 1, wherein each optical sensor of the at least one single or multi line optical sensor is arranged across from a respective coherent light source of the at least one coherent light source.

19. The method according to claim 1, wherein a measurement axis of an optical sensor of the at least one single or multi line optical sensor is substantially perpendicular to a main beam direction of a coherent light source of the at least one coherent light source.

20. The method according to claim 1, wherein the object is transparent at least to some extent.

21. The method according to claim 1, wherein the object has a diameter of less than 1 mm.

\* \* \* \* \*